United States Patent Office 3,759,797
Patented Sept. 18, 1973

3,759,797
SURFACE COATING METHOD BY ELECTROLYTIC POLYMERIZATION
Kunihiko Masunaga and Hiroshi Shinohara, Toyota, Japan, assignors to Toyota Jidosha Kogyo Kabushiki Kaisha, Aichi-ken, Japan
No Drawing. Filed Dec. 8, 1971, Ser. No. 206,122
Claims priority, application Japan, Dec. 21, 1970, 45/114,918
Int. Cl. C23b 11/00
U.S. Cl. 204—14 N                                 7 Claims

ABSTRACT OF THE DISCLOSURE

The present invention provides a method of forming an electrolytically polymerized coat of vinyl polymer on the surface of an object, with its polymerization being carried out under control by adding one or more of alcohols, quinones and mercaptans into a monomer mixture solution for electrolytic coating.

BACKGROUND OF THE INVENTION

The present invention relates to a coating method, and more particularly to a coating method that involves electrolytic polymerization.

Lately, industrial applications of electrophoretic coating have become widespread. According to this coating method, an electroconductive object is coated through electrolysis, electrophoresis, electrodeposition, and electroendosmosis in a pre-polymer solution of certain molecular weight.

In the case of electrophoretic coating, several steps are involved such as washing with water, air-blowing, heating and drying, and removal of excess amine out of the vessel. Moreover, the coating material must be preliminarily polymerized from monomer to pre-polymer.

In the case of electrolytic polymerization, however, both film formation and polymerization out of a material monomer can be done simultaneously. In the conventional coating method by electrolytic polymerization, electric direct current is passed through a monomer solution, and as a result a film is formed on the electrode plate (mainly cathode), while at the same time polymerization takes place in the solution. As a result the monomer in the solution is consumed thereby causing troubles such as retarded formation of film or necessity to remove the formed polymer out of the solution.

After various studies the present inventors have succeeded in perfecting the present invention which eliminates the above difficulties.

SUMMARY OF THE INVENTION

An object of the present invention is to avoid the difficulties of the prior art by providing a unique process for coating by electrolytic polymerization.

The present invention relates to a surface coating method by electrolytic polymerization, characterized by using as the electrolytic polymerization mixed bath a mixture of a vinyl monomer, a supporting electrolyte for enhancing electroconductivity and an organic solvent, added with one or more of lower straight chain alcohols, quinones, and mercaptans. With an object to be coated as one of the electrodes, a direct current is passed through this mixture thereby forming a polymerized coating of vinyl polymer on the surface of the object. At the same time the formation of a polymer in the mixture is inhibited.

DETAILED DESCRIPTION OF THE INVENTION

The present invention relates to a method of forming a polymerized coating of vinyl polymer on an object through electrolysis with the object to be coated as one on the electrodes, and at the same time inhibiting the growth of a polymer in the solution.

More specifically, the method of the present invention is executed as follows. A vinyl compound such as acrylic acids or acrylic esters as dissolved in an organic solvent is poured into an electrolytic vessel. To improve the electroconductivity of this solution, a supporting electrolyte is added. Also, an additive such as lower straight chain alcohols, mercaptans, or quinones may be added to the solution.

The object to be coated functions as a cathode. The cathode and an electroconductive anode are immersed in the solution, and a direct current is passed through the solution. After a preset time, the electrodes are lifted and dried.

Useful vinyl compounds include methacrylonitrile, which is the best; methylmethacrylate, acrylonitrile, ethylacrylate, acrylamide, 2-hydroxyethylmethacrylate, glycidylacrylate, glycidylmethacrylate, styrene, divinyl sulfone, N,N'-methylene-bis-acrylamide, ethylene glycol dimethacrylate, methylacrylate, ethylmethacrylate, etc. Useful organic solvents include dimethylsulfoxide, dimethylacetamide, dimethylformamide, acetonitrile, benzene, toluene, xylene, etc.

Useful additives are: Lower straight chain alcohols such as methylalcohol, ethylalcohol, propylalcohol, n-butylalcohol, n-amylalcohol; quinones such as benzoquinone, hydroquinone, phenanthraquinone, 2,5-dimethylquinone, and tetrachloro benzoquinone; mercaptans such as ethylmercaptan, propylmercaptan, butylmercaptan, benzylmercaptan and thiophenols.

As the present invention is executed using such an addtive, polymerization in the solution is inhibited and this permits effective utilization of the monomer. This results in no need for removal of a polymer out of the solution. Also, the concentration of the monomer in the solution can be regulated in terms of the total area of coating.

For the sake of comparison, an example of execution by the conventional method is cited.

Reference example

When the current at a density of 2 ma./cm.$^2$ is passed for 5 minutes through the following composition:

|  | G. |
|---|---|
| Methacrylonitrile | 50 |
| Dimethylacetamide | 50 |
| McKee salt | 0.5 | in a stream of nitrogen at 25° C., with a carbon rod as the anode and a 12 cm.$^2$ aluminum plate as the cathode, a yellow coat of 0.28 g. polymethacrylonitrile is formed on the aluminum plate. At the same time 0.063 g. of polymethacrylonitrile emerges in the solution. With further passage of current it accumulates, resulting in the monomer being consumed other than in the formation of the coating. In this case, the polymer on the coating surface is weighed before and after polymerization, while the polymer in the solution is weighed by pouring the solution used for polymerization into methanol, crystallizing, filtering and drying it.

Examples of execution by the method according to the present invention are cited below.

Example 1

Using the following composition:

|  | G. |
|---|---|
| Methacrylonitrile | 50 |
| Dimethylacetamide | 50 |
| McKee salt | 0.5 |
| Ethanol | 0.4 | and under the same conditions as in the reference example, polymerization is carried out, to produce a coating of 0.18 g. on the aluminum plate. The amount of polymethacrylonitrile in the solution is only 0.004 g. This volume, as converted in terms of polymer weight in the solution against the weight of the coating, corresponds to about 1/10 of the value in the reference example.

Example 2

Using the following composition:

|  | G. |
|---|---|
| Methacrylonitrile | 50 |
| Dimethylacetamide | 50 |
| McKee salt | 0.5 |
| n-Amylalcohol | 0.4 | and under the same conditions as in the reference example, polymerization is carried out. The weight of the coating is 0.25 g. and the polymer in the solution is 0.004 g. This volume, as converted in terms of polymer weight in the solution against the weight of the coating, corresponds to about 1/17 of the value in the reference example.

Example 3

Using the following composition:

|  | G. |
|---|---|
| Methacrylonitrile | 50 |
| Dimethylacetamide | 50 |
| McKee salt | 0.5 |
| p-Benzoquinone | 0.5 | and under the same conditions as in the reference example, polymerization is carried out to produce a coating of coating of 0.27 g. polymethacrylonitrile on the aluminum plate, and 0.049 g. of a polymer occurs in the solution. As converted in terms of polymer weight in the solution against the weight of the coating, this is equivalent to about 4/5 of the value in the reference example.

Example 4

Using the following composition:

|  | G. |
|---|---|
| Methacrylonitrile | 50 |
| Dimethylacetamide | 50 |
| McKee salt | 0.5 |
| Ethylmercaptan | 0.4 | and under the same conditions as in the reference example, polymerization is carried out to prodce a coating of 0.26 g. on the aluminum plate. Thereby, the amount of a polymer in the solution is only 0.012 g. As converted in terms of the polymer weight in the solution against the weight of the coating, this is equivalent to about 1/5 of the value in the reference example.

Example 5

Using the following composition:

|  | G. |
|---|---|
| Methacrylonitrile | 50 |
| Dioxane | 50 |
| McKee salt | 0.5 |
| n-Amylalcohol | 0.4 | and under the same conditions as in the reference example, polymerization is carried out to produce a coating of 1.5 g. on the aluminum plate and 0.50 g. of a polymer occurs in the solution. When in this case n-amylalcohol is not added, the coat will be 1.4 g. and the polymer in the solution will amount to 0.60 g. Through addition of n-amylalcohol, the value as converted in terms of polymer weight in the solution against the weight of the coating will be reduced to about 7/10 of the value in the case without adding the same.

Example 6

Using the following composition:

|  | G. |
|---|---|
| Methylmethacrylate | 50 |
| Dimethylacetamide | 50 |
| McKee salt | 0.5 |
| n-Propylalcohol | 0.4 | and under the same conditions as in the reference example, polymerization is carried out to produce a coating of 3.1 g. on the cathode plate. The polymer in the solution is 0.16 g. When in this case n-propylalcohol is not added, the coating will be 3.1 g. and in the polymer in the solution is 0.31 g. Through addition of n-propylalcohol, the value as converted in terms of polymer weight in the solution against the weight of the coating is reduced to about one-half.

Example 7

Using the following composition:

|  | G. |
|---|---|
| Methylvinylketone | 50 |
| Dimethylacetamide | 50 |
| McKee salt | 0.5 |
| Ethylmercaptan | 0.5 | and under the same conditions as in the reference example, polymerization is carried out to produce a coating of 1.8 g. on the cathode plate and in the solution 0.25 g. of a polymer occurs. When in this case ethylmercaptan is not added, the coating will be 1.7 g. and in the polymer in the solution is 0.38 g. Through addition of ethylmercaptan, the value as converted in terms of polymer weight in the solution against the weight of the coating is reduced to about three-fifths.

Example 8

Using the following composition:

|  | G. |
|---|---|
| Methacrylonitrile | 20 |
| Glycidylacrylate | 10 |
| Dimethylacetamide | 70 |
| McKee salt | 0.2 |
| Thiophenol | 0.5 | and under the same conditions as in the reference but this time a current at a density of 5 ma./cm.$^2$ is passed for 3 minutes, a copolymerized coating is produced on the aluminum plate. The weight of this coating is 0.32 g. and 0.12 g. of a polymer occurs in the solution. When thiophenol is not added in this case, the coating will be 0.36 g. and the polymer in the solution is 0.34 g. Through addition of thiophenol, the value as converted in terms of polymer weight in the solution against the weight of the coating is reduced to about one-half.

Example 9

Using the following composition:

|  | G. |
|---|---|
| Methacrylonitrile | 15 |
| Methylmethacrylate | 5 |
| Glycidylmethacrylate | 5 |
| Dimethylformamide | 75 |
| McKee salt | 0.2 |
| Phenanthraquinone | 0.5 | and under the same conditions as in the reference but with a current at a density of 4 ma./cm.$^2$ passed for 5 minutes, a copolymerized coating is obtained on the aluminum plate. This coating weighs 0.73 g. and the polymer in the solution is 0.31 g. When phenanthraquinone is not added in this polymerization, the coating will be 0.82 g. and in the solution 0.68 g. of polymer will occur. Through addition of phenanthraquinone, the value as converted in terms of polymer weight in the solution against the weight of the coating is reduced to about one-half.

Example 10

Using the following composition:

| | G. |
|---|---|
| Glycidylmethacrylate | 20 |
| Methylmethacrylate | 20 |
| Dimethylsulfoxide | 60 |
| McKee salt | 0.2 |
| Methanol | 0.2 | and under the same conditions as in the reference but with a current at a density of 5 ma./cm.² passed for 4 minutes, a copolymerized coating is formed on the aluminum plate. This coating weighs 0.46 g., and simultaneously 0.08 g. of a polymer occurs in the solution. When methanol is not added in this case, the coating will be 0.50 g. and the polymer will be 0.26 g. in the solution. Accordingly, through addition of methanol, the value as converted in terms of polymer weight in the solution against the weight of the coating is reduced to about one-third.

Example 11

Using the following composition:

| | G. |
|---|---|
| Methacrylonitrile | 20 |
| Ethylacrylate | 20 |
| Dimethylformamide | 60 |
| McKee salt | 0.2 |
| Benzylmercaptan | 0.5 | and under the same conditions as in the reference but with a current at a density of 4 ma./cm.² passed for 5 minutes, a copolymerized coating is formed on the aluminum plate. The weight of this coating is 0.32 g., and simultaneously 0.13 g. of a polymer occurs in the solution. When benzylmercaptan is not added to this system, the coating will be 0.36 g. and the polymer in the solution weighs 0.42 g. Through addition of benzylmercaptan, the value as converted in terms of polymer weight in the solution against the weight of the coating is reduced to about one-half.

Example 12

Using the following composition:

| | G. |
|---|---|
| Acrylonitrile | 15 |
| Methylacrylate | 25 |
| Dimethylacetamide | 60 |
| McKee salt | 0.2 |
| 2,5-dimethylquinone | 0.5 | and under the same conditions as in the reference but with a current at a density of 5 ma./cm.² passed for 3 minutes, a copolymerized coating is formed on the aluminum plate. The weight of this coating is 0.48 g., and simultaneously 0.10 g. of a polymer occurs in the solution. When 2,5-dimethylquinone is not added to this system, the coating will be 0.52 g. and the polymer in the solution will be 0.43 g. Through addition of 2,5-dimethylquinone, the value as converted in terms of polymer weight in the solution against the weight of the coating is reduced to about one-quarter.

Example 13

Using the following compositions:

| | G. |
|---|---|
| Methacrylonitrile | 20 |
| Ethylmethacrylate | 30 |
| Dimethylformamide | 50 |
| McKee salt | 0.2 |
| Butylmercaptan | 0.5 | and under the same conditions as in the reference but with a current at a density of 5 ma./cm.² passed for 3 minutes, a copolymerized coating is formed on the aluminum plate. The weight of this coating is 0.36 g., and simultaneously 0.16 g. of a polymer occurs in the solution. Without addition of butylmercaptan to this system, the weight of the coating will be 0.40 g. and 0.38 g. of a polymer will occur in the solution. Through addition of butylmercaptan, the value as converted in terms of polymer weight in the solution against the weight of the coating is reduced to about one-half.

Example 14

Using the following composition:

| | G. |
|---|---|
| Acrylonitrile | 10 |
| N,N'-methylene-bis-acrylamide | 5 |
| Dimethylformamide | 85 |
| McKee salt | 0.2 | and under similar conditions as in the reference example, the current at a density of 8 ma./cm.² is passed for 3 minutes and as a result a copolymerized cross linking coating is formed on the aluminum plate. The coating weighs 0.28 g. and at the same time 0.68 g. of a polymer occurs in the solution. If 0.4 g. of n-propylalcohol is added to this system for polymerization, the coating will be 0.29 g. and the polymer in the solution will be 0.40 g. Thus, through addition of n-propylalcohol, the value as converted in terms of polymer weight in the solution against the coating weight is reduced to about one-half.

Example 15

Using the following composition:

| | G. |
|---|---|
| Methacrylonitrile | 20 |
| Glycidylmethacrylate | 20 |
| Divinyl sulfone | 5 |
| Dimethylacetamide | 55 |
| McKee salt | 0.2 | and under similar conditions as in the reference, the current at a density of 5 ma./cm.² is passed for 4 minutes. As a result, a copolymerized cross linking coating is formed on the aluminum plate. The coating weighs 0.34 g. and at the same time 0.42 g. of a polymer occurs in the solution. If 0.5 g. of tetrachloro benzoquinone is added to this system, the coating will be 0.36 g. and the polymer in the solution will be 0.10 g. Thus, through addition of tetrachloro benzoquinone, the value as converted in terms of polymer weight in the solution against the coating weight is reduced to about one-fifth.

Example 16

Using the following composition:

| | G. |
|---|---|
| Methylmethacrylate | 45 |
| Ethylene glycol dimethacrylate | 15 |
| Dimethylacetamide | 40 |
| McKee salt | 0.5 | and under similar conditions as in the reference, the current at a density of 5 ma./cm.² is passed for 3 minutes. As a result, a copolymerized cross linking coating is formed on the aluminum plate. The coating weighs 0.36 g. and at the time 0.38 g. of a polymer occurs in the solution. On the other hand, if 0.5 g. of methylmercaptan is added to this system, then the coating will be 0.40 g. and the polymer in the solution will be 0.08 g. Thus, through addition of methylmercaptan, the value as converted in terms of polymer weight in the solution against the coating weight is reduced to about one-fifth.

What is claimed is:

1. A method of coating by electrolytic polymerization comprising the steps of using as the electrolytic polymerization solution a mixture of a vinyl monomer, an organic solvent, and a supporting electrolyte to enhance electroconductivity, adding one or more of lower straight chain alcohols, quinones and mercaptans to the solution, and locating a carbon anode and an object to be coated as a cathode in the solution, passing a direct current between the anode and cathode to thereby form a polymerized coating of a vinyl polymer on the surface of the cathode while at the same time inhibiting the formation of a polymer in the solution.

2. A coating method as in claim 1 wherein the vinyl monomer is selected from the group consisting of methacrylonitrile, methylmethacrylate, acrylonitrile, ethylacrylate, acrylamide, 2-hydroxyethylmethacrylate, glycidylmethacrylate, styrene, divinyl sulfone, N,N'-methylenebis-acrylamide, ethyleneglycol dimethacrylate, glycidylacrylate, methylacrylate and ethylmethacrylate.

3. A coating method as in claim 1 wherein the organic solvent is selected from the group consisting of dimethyl sulfoxide, dimethylformamide, acetonitrile, benzene, toluene and xylene.

4. A coating method as in claim 1 wherein the lower straight chain alcohol is selected from the group consisting of methyl alcohol, ethyl alcohol, propyl alcohol, n-butyl alcohol and n-amyl alcohol.

5. A coating method as in claim 1 wherein the quinone is selected from the group consisting of benzoquinone, hyroquinone, phenanthraquinone, 2,5-dimethylquinone and tetrachloro benzoquinone.

6. A coating method as in claim 1 wherein the mercaptan is selected from the group consisting of mercaptan, methylmercaptan, ethylmercaptan, propylmercaptan, butylmercaptan, benzylmercaptan and thiophenols.

7. A coating method as in claim 1 including the step of bubbling nitrogen into the solution during electrolytic polymerization.

References Cited
UNITED STATES PATENTS 3,175,964   3/1965   Watanabe et al. ____ 204—56 R JOHN H. MACK, Primary Examiner R. L. ANDREWS, Assistant Examiner U.S. Cl. X.R.

204—50 R, 59